United States Patent [19]

Adams et al.

[11] Patent Number: 5,076,016
[45] Date of Patent: Dec. 31, 1991

[54] POWERED SLIDING DOOR SYSTEM

[75] Inventors: Allan J. Adams, Lincoln Park; Michael P. Alexander, Grosse Ile, both of Mich.

[73] Assignee: ASC Incorporated, Southgate, Mich.

[21] Appl. No.: 566,614

[22] Filed: Aug. 13, 1990

Related U.S. Application Data

[63] Continuation-in-part of Ser. No. 416,990, Oct. 4, 1989, abandoned.

[51] Int. Cl.⁵ .................. E05F 11/00; E05F 15/00
[52] U.S. Cl. ........................ 49/360; 49/30; 49/280
[58] Field of Search ........... 49/280, 215, 214, 213, 49/212, 216, 362, 360, 349, 30, 28, 449, 394

[56] References Cited

U.S. PATENT DOCUMENTS

| | | | |
|---|---|---|---|
| 3,334,443 | 8/1967 | Eskra et al. | 49/349 |
| 3,533,188 | 10/1970 | Jones et al. | 49/360 |
| 3,662,491 | 5/1972 | Boyriven | 49/30 X |
| 3,874,117 | 4/1975 | Boehm | 49/30 X |
| 4,050,189 | 9/1977 | Peterson | 49/360 X |
| 4,313,281 | 2/1982 | Richmond | 49/280 |
| 4,330,960 | 5/1982 | Hasemann et al. | 49/360 X |
| 4,426,639 | 1/1984 | Jessup | 49/30 X |
| 4,462,185 | 7/1984 | Shibuki et al. | 49/360 X |
| 4,471,251 | 9/1984 | Yamashita | 49/349 X |
| 4,612,729 | 9/1986 | Sato | 49/362 |
| 4,617,757 | 10/1986 | Kagiyama et al. | 49/280 |
| 4,618,174 | 10/1986 | Duke | 49/280 X |
| 4,640,050 | 2/1987 | Yamagishi et al. | 49/280 |
| 4,702,514 | 10/1987 | Perry | 49/212 X |
| 4,775,178 | 10/1988 | Boyko | 49/449 X |
| 4,821,024 | 4/1989 | Bayha | 49/30 X |
| 4,862,640 | 9/1989 | Boyko et al. | 49/280 X |
| 4,881,018 | 11/1989 | Kato et al. | 49/349 X |

Primary Examiner—Philip C. Kannan
Attorney, Agent, or Firm—Harness, Dickey & Pierce

[57] ABSTRACT

The present invention is a powered sliding door system for a vehicle including a semi-rigid cable adapted to be affixed to the sliding door of a vehicle and a powered electromagnetic clutch for driving the cable longitudinally for opening and closing the sliding door.

30 Claims, 6 Drawing Sheets

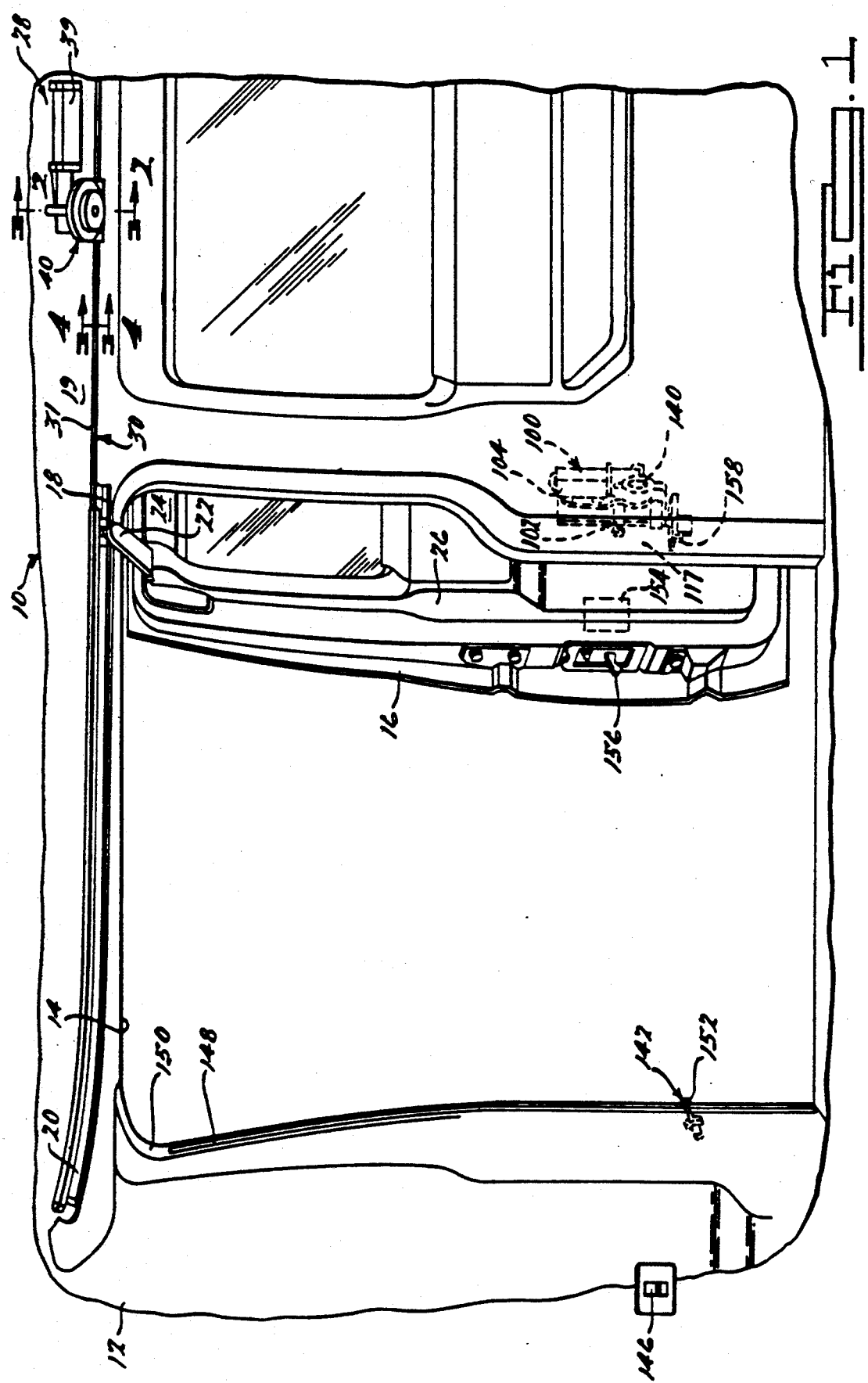

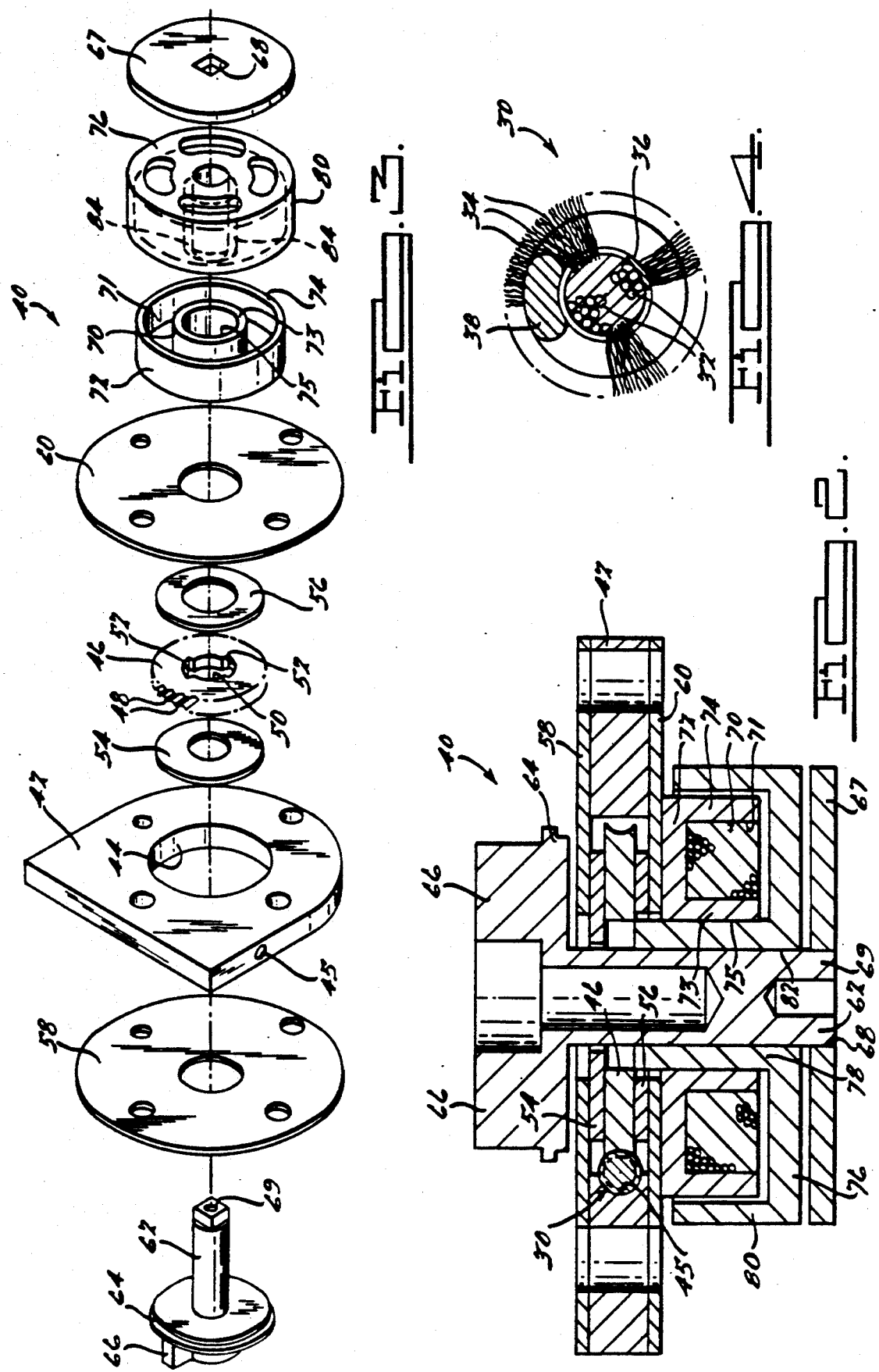

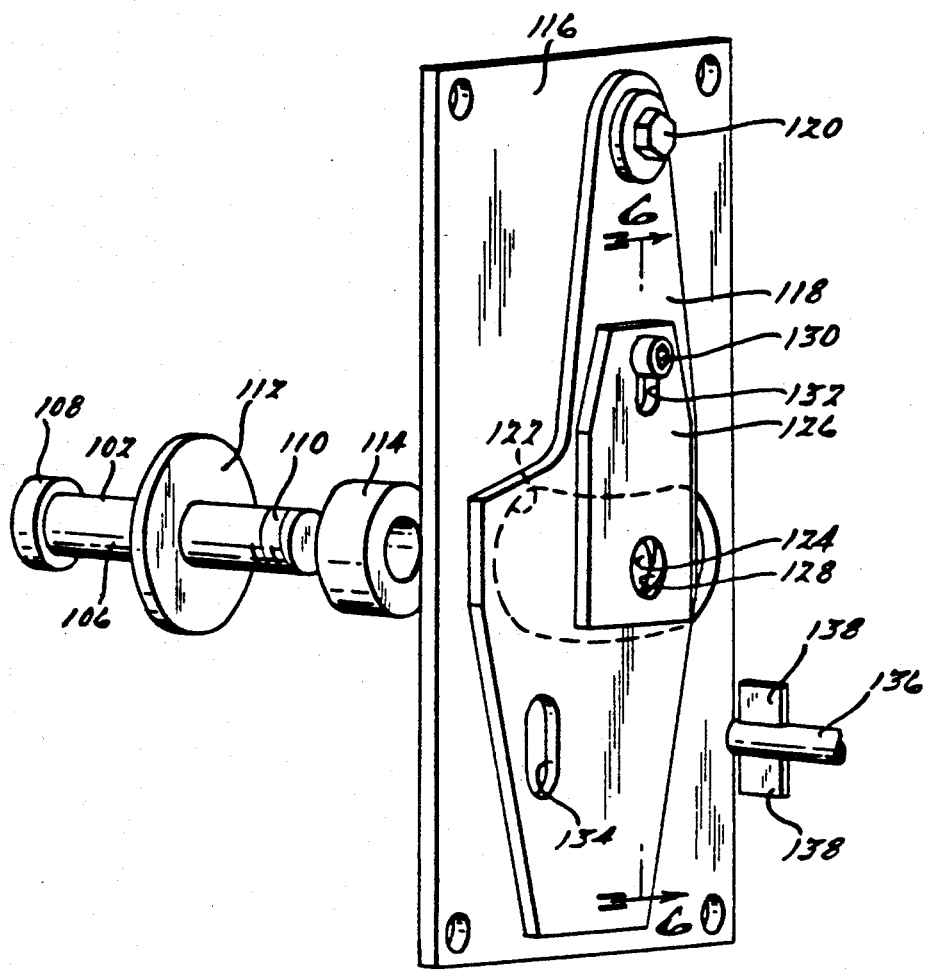
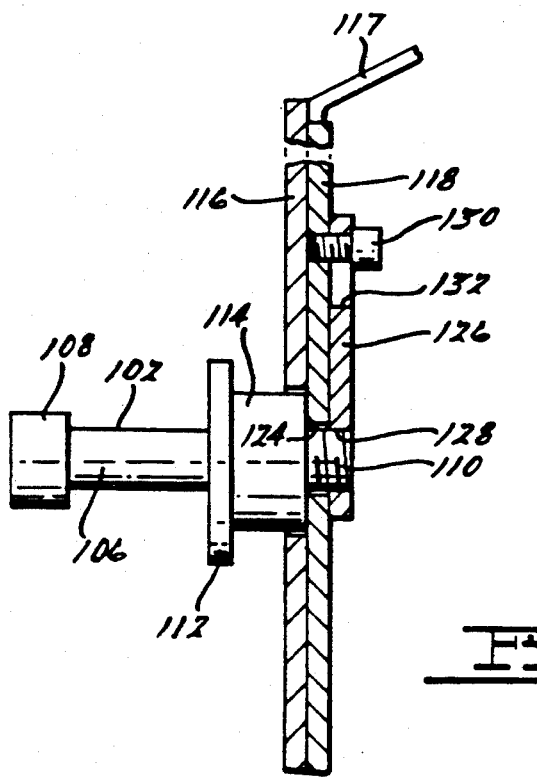

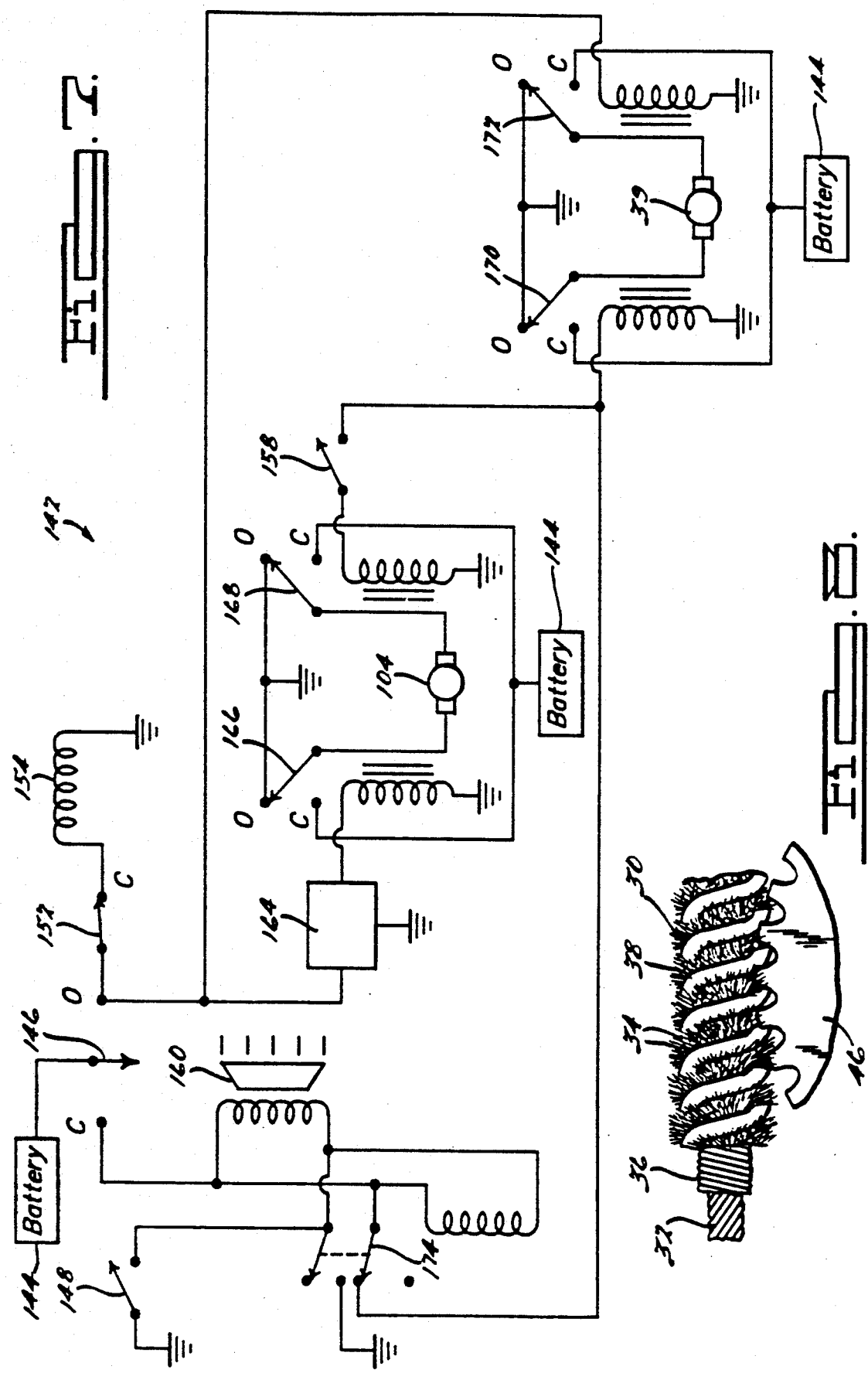

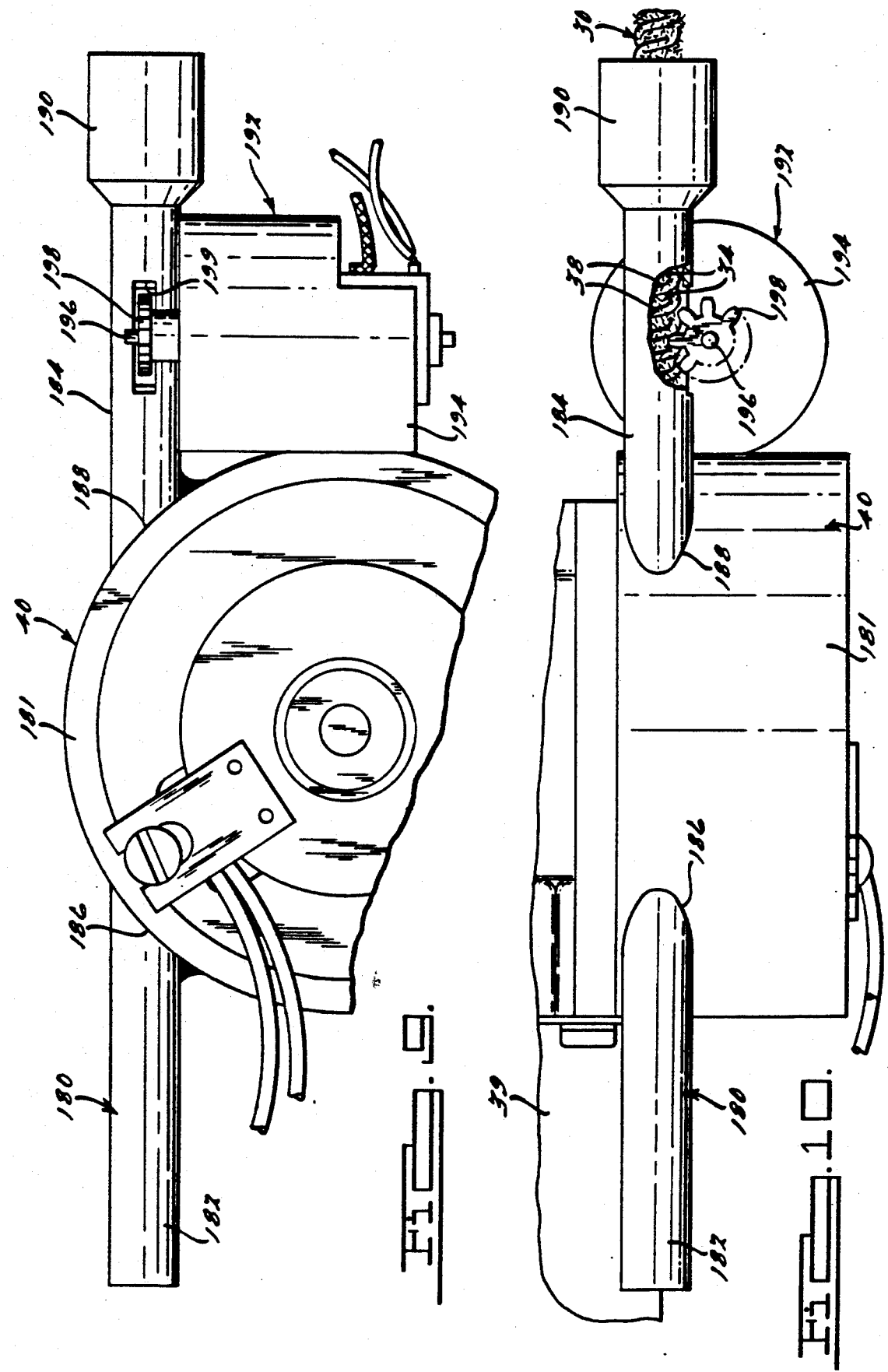

5,076,016

POWERED SLIDING DOOR SYSTEM

CROSS-REFERENCE TO RELATED APPLICATIONS

This application is a continuation-in-part of Ser. No. 416,990, filed Oct. 4, 1990, now abandoned.

BACKGROUND AND SUMMARY OF THE INVENTION

The present invention relates generally to automotive vehicles, and more particularly to, a powered sliding door system for opening and closing a sliding door of an automotive vehicle.

In the past, several automatic or powered sliding door systems have been developed. An example of one such system is disclosed in U.S. Pat. No. 4,640,050, issued Feb. 3, 1987, by inventors Yamagishi et al. The patented system includes wires attached to a sliding door of a vehicle and a guide affixed to a body of the vehicle so as to guide the wires in a generally closed loop path. The patented system also includes a winding drum, around which the wires are wound, mounted to the body and rotatable in either direction to send the wires along the guide. A driving motor is mounted to the body and operatively connected to the winding drum through a speed reducer and an electromagnetic clutch to move the wires for opening and closing the sliding door.

One disadvantage of the above patented system is that a complex arrangement of guides are needed to guide the wires in a closed loop path. Another disadvantage is that a winding drum is required to move the wires along the guides. Both result in added cost of the system and installation time.

It is, therefore, a primary object of the present invention to provide an improved and safe to use powered sliding door system for an automotive vehicle.

It is another object of the present invention to provide a powered sliding door system having a simpler arrangement than known systems, requiring fewer parts, less cost and reduced installation time.

To achieve the foregoing objects, the present invention utilizes a semi-rigid cable adapted to be affixed to a sliding door of a vehicle and to extend longitudinally thereof. The system also includes electromagnetic clutch means operatively cooperating with the cable and driving means mounted to a body of the vehicle and operatively connected to the electromagnetic clutch means for rotating the electromagnetic clutch means to move the cable longitudinally for opening and closing the sliding door.

One advantage of the present invention is that the cable is moved in a linear manner generally parallel with the longitudinal axis of the vehicle, eliminating the need for extensive guides and winding drums. Another advantage of the present invention is that the sliding door may be manually operated or moved between open and closed positions if desired. Numerous safety features are also provided. One safety feature is that the logic of the system detects a reduction of speed in the sliding door for the entire travel of the door and disconnects the drive motor to prevent objects from being sandwiched by the door.

Other advantages of the present invention will be readily appreciated as the same becomes better understood after reading the following description when considered in connection with the accompanying drawings.

BRIEF DESCRIPTION OF THE DRAWINGS

FIG. 1 is a partial elevational view of an automotive vehicle incorporating a powered sliding door system according to the present invention.

FIG. 2 is a sectional view taken along line 2—2 of FIG. 1.

FIG. 3 is an exploded view of the electromagnetic clutch of FIG. 2.

FIG. 4 is a sectional view taken along line 4—4 of FIG. 1.

FIG. 5 is a partial perspective view of a striker assembly for the powered sliding door system of FIG. 1.

FIG. 6 is a sectional view taken along line 6—6 of FIG. 5.

FIG. 7 is a schematic view of an electrical control circuit for the powered sliding door system of FIG. 1.

FIG. 8 is a fragmentary diagrammatic side elevational view of the powered cable of the present invention showing how it is actuated.

FIG. 9 is a partial rear view of a second embodiment of the electromagnetic clutch of FIG. 2 incorporating a speed sensor according to the present invention.

FIG. 10 is a partial elevational view of the electromagnetic clutch of FIG. 9.

DESCRIPTION OF THE PREFERRED EMBODIMENT(S)

Figure 11:
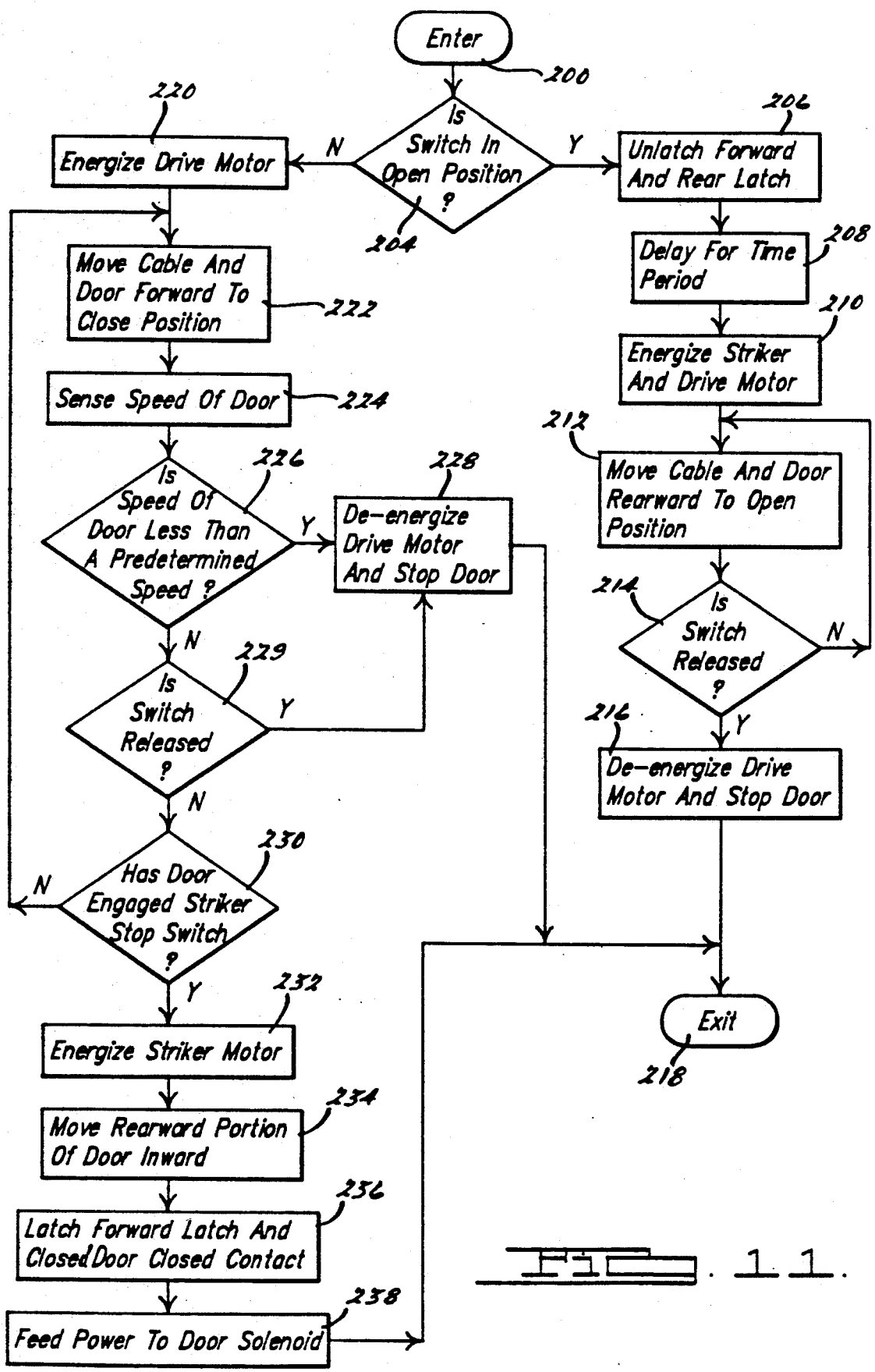
FIG. 11 is a flowchart illustrating the operation of the second embodiment of the powered sliding door system of FIG. 1 incorporating the speed sensor of FIGS. 9 and 10.

Referring to FIG. 1, an automotive vehicle, generally indicated at 10, such as a van type automotive vehicle, includes a vehicle body 12 having a generally rectangular opening 14 and a correspondingly shaped sliding door 16 for opening and closing opening 14. A channel shaped upper rail 18 which extends generally parallel to the longitudinal axis of vehicle 10 is affixed to an upper part of a side wall 19 of vehicle body 12. A front end portion 20 of upper rail 18 is slightly arcuate or curved toward the inside of vehicle body 12 to pull the front edge of the sliding door 16 inwardly and forwardly when it is closed. An upper roller device 22 is attached to an upper inside surface 24 of a front end portion 26 of sliding door 16 and is slidably received within upper rail 18. A similar front roller and track assembly (not shown) may be provided at the bottom of sliding door 16 to further guide the latter, with the rear edge of sliding door 16 being similarly guided utilizing a roller device on the rear edge of the sliding door 16 which rolls in a track in the outside surface of side wall 19. Up to this point, the apparatus described is fully conventional.

Powered sliding door system 28 includes a semi-rigid cable, generally indicated at 30, attached to upper roller device 22 and extending generally parallel with the longitudinal axis of vehicle 10. Cable 30 preferably extends within a tube 31 attached by suitable means to side wall 19. Referring to FIGS. 4 and 8, cable 30 includes a plurality of first wires 32 twisted together in one direction and extending longitudinally to form a generally circular core, and a plurality of bristles 34 extending radially outwardly from first wires 32. Bristles 34 are adapted to hold a lubricant placed on cable 30. A plurality of second wires 36 are tightly wrapped or coiled about first wires 32 and bristles 34 in a helical manner in the opposite direction to allow some of the bristles 34 to extend radially beyond second wires 36 at spaced locations along the longitudinal length of the cable. Cable 30 further includes a single third wire 38 tightly wrapped or coiled about second wires 36 in a helical manner opposite in hand to that of second wires 36, which also allows bristles 34 to extend through spaces in adjacent coils. The coils of third wire 38 are spaced to act as a gear rack. Third wire 38 has a diameter greater than second wires 36. As constructed, cable 30 is semi-rigid, but permitting some flexibility.

Powered sliding door system 28 also includes a reversible electric drive motor 39 for rotating an electromagnetic clutch, generally indicated at 40, which operatively cooperates with cable 30 for directly driving sliding door 16 between its open and closed positions. Drive motor 39 is secured to side wall 19 by suitable fasteners (not shown). It should be appreciated that drive motor 39 is conventional and may be of a suitable type, such as a powered window drive motor and includes a gear reduction unit.

Referring to FIGS. 2 and 3, electromagnetic clutch 40 includes a bracket 42 having a generally "D" shaped configuration and a centrally disposed aperture 44 extending therethrough. Bracket 42 is mounted to side wall 19 by suitable fasteners (not shown). Bracket 42 includes a generally circular passageway 45 extending longitudinally through the sides thereof and communicating with aperture 44. Cable 30 extends through passageway 45 and drivingly engages a gear 46 disposed within aperture 44. Gear 46 has a plurality of circumferentially spaced teeth 48 engaging adjacent wraps of third wire 38 similar to a "rack and pinion" drive, as best illustrated in FIG. 8. Gear 46 also has a center aperture 50 with a pair of oppositely disposed recesses or key ways 52 extending radially outwardly therefrom. First and second washers 54 and 56 are disposed on opposite sides of gear 46. Circular cover plates 58 and 60 are disposed on opposite sides of bracket 42 to secure gear 46 and washers 54 and 56 within aperture 44. It should be appreciated that any suitable means, such as threaded fasteners (not shown), may be used to secure plates 58 and 60 and bracket 42 together as a single unit.

Electromagnetic clutch 40 also includes a generally cylindrical shaft 62 which extends through corresponding apertures in plates 58 and 60, washers 54 and 56, and aperture 50 in gear 46. Shaft 62 has a flange portion 64 extending radially outwardly near one end which can abut bearing plate 58 to limit movement of shaft 62 in one direction. Flange portion 64 has a plurality of driven lugs 66 which are driven via a conventional rubber coupling and gear reduction by drive motor 39. A clutch member 67 has a generally rectangular aperture 68 in which a correspondingly shaped end 69 of shaft 62 is non-rotatively disposed. Clutch member 67 is secured to shaft 62, such as by means of a threaded fastener (not shown), so that shaft 62 and clutch member 67 rotate as an integral unit.

Electromagnetic clutch 40 further includes a coil 70 for producing a magnetic field when energized. Coil 70 has a generally annular configuration and is disposed within a correspondingly shaped annular pocket 71 formed by an annular retainer 72 having inner and outer axial flanges 73 and 74 to form a "U" shaped cross-section. Inner axial flange 73 defines a bore 75 surrounding shaft 62. An annular armature member 76 is disposed between coil 70 and clutch member 67 and has inner and outer axially extending flanges 78 and 80 forming a generally "U" shaped cross-section. Inner flange 78 is slidably and rotatively disposed in bore 75 and itself defines a bore 82 in which shaft 62 is disposed for rotational and limited axial movement. The inner end of flange 78 has oppositely disposed and axially extending projections or keys 84 which are slideably and drivingly engaged with key ways 52 of gear 46. Armature member 76 is journalled about shaft 62 such that armature member 76 moves axially relative to shaft 62 in response to the presence or absence of a magnetic field produced by coil 70.

In operation, when actuated drive motor 39 rotates projections 66 which in turn rotate shaft 62. The rotation of shaft 62 in turn rotates clutch member 67. When coil 70 is energized, a magnetic field is created which pushes or repels armature member 76 to engage clutch member 67 and thereby be driven. Engagement between keys 84 of armature member 76 and key ways 52 in gear 46 causes gear 46 to rotate with armature member 76. Rotation of gear 46 drives cable 30 longitudinally back or forth (depending on the direction of rotation) due to teeth 48 engaging adjacent wraps of third wire 38, as illustrated in FIG. 8. This, in turn, moves the sliding door 16 between its open and closed positions. When coil 70 is de-energized, armature member 76 is free to move axially away from clutch member 67 and thereby becomes disengaged, stopping rotation of armature member 76 and gear 46. As a result, cable 30 is no longer powered longitudinally. The clutch is designed so that it will slip if the door encounters an obstruction while drive motor 39 is energized. It is also designed so that the door can be manually opened and closed.

Referring to FIG. 1 again, system 28 also includes a striker assembly, generally indicated at 100, for moving the rearward end of sliding door 16 inwardly and outwardly relative to side wall 19. Striker assembly 100 includes a conventional striker member 102 which uniquely cooperates with a reversible electric striker motor 104, which may be of conventional construction, such as a sun roof module motor. Referring to FIGS. 5 and 6, striker member 102 comprises a cylinder shaft 106 having an enlarged head portion 108 for engaging and disengaging a conventional door latch (not shown) in the rearward portion of sliding door 16. Striker member 102 also has a threaded end portion 110 and a radially outwardly extending flange 112 disposed axially between enlarged head portion 108 and threaded end portion 110. A spacer 114 is disposed about striker member 102 between flange 112 and threaded end portion 110. Striker assembly 100 also includes a striker mounting bracket 116 secured by suitable fasteners (not shown) to a vehicle wall 117 defining a rearward portion of opening 14, and includes a striker pivot link 118 having one end pivotally connected by means of a fastener 120 to striker mounting bracket 116 and extending downwardly for pivotal movement about the axis of fastener 120. Threaded end portion 110 extends through an elongated and arcuate aperture 122 in striker mounting bracket 116 and a generally circular aperture 124 in striker pivot link 118. A generally rectangular nut plate 126 having a threaded aperture 128 engages threaded end portion 110 of striker member 102 and is disposed on the other side of striker pivot link 118. Nut plate 126 is rigidly but adjustably secured to striker pivot link 118 by suitable means such as a fastener 130 which extends through a generally vertical elongated aperture 132. Striker member 102, nut plate 126 and striker pivot link 118 pivot as a single unit in a plane which is transverse to the longitudinal axis of the vehicle but which extends obliquely outwardly and rearwardly with respect thereto, i.e. generally parallel to the normal direction of movement of the rearward end of a van door adjacent its closed position.

Striker pivot link 118 also includes a generally vertically orientated elongated aperture 134 near its lower end in which is disposed a drive shaft 136 having a pair of oppositely disposed flange members 138 extending outwardly therefrom, similar to a key. Shaft 136 is operatively connected to striker motor 104 by suitable means such as a worm and worm wheel gear reduction assembly 140 to rotate shaft 136 and flange members 138, plus or minus approximately 90° in either direction from the position shown, thereby rotating or pivoting striker pivot link 118. Because of the geometry of the arrangement, this causes striker member 102 to move substantially longitudinally with respect to the vehicle.

To move the rearward end of sliding door 16 relative to side wall 19, striker motor 104 is energized. As a result, worm and worm wheel assembly 140 rotates shaft 136 and flange members 138, in turn pivoting striker pivot link 118, nut plate 126 and striker member 102 to move the rearward end of sliding door 16 either outwardly and slightly rearwardly or inwardly and slightly forwardly, depending on the direction of rotation of striker motor 104.

Referring to FIGS. 1 and 7, system 10 further includes a control circuit, generally indicated at 142, for controlling the opening and closing of sliding door 16. Control circuit 142 includes a power source 144 such as the battery of vehicle 10 to provide electrical power to the drive and striker motors 39 and 104, respectively, an operating switch 146 mounted in any suitable location to permit actuation of the system by an operator, and a pressure sensitive ribbon switch 148 mounted along the front wall 150 defining opening 14 to act as an emergency stop. Ribbon switch 148 is closed when an object or person is caught between front wall 150 and sliding door 16, to disconnect electrical power to drive motor 39. Control circuit 142 also includes a spring loaded door contact 152 mounted on front wall 150 to allow power to feed from power source 144 when sliding door 16 is closed to a door solenoid coil 154 which simultaneously actuates forward latch member 156 and the rear latch (not shown) to an unlatched condition. A striker stop switch 158 is provided to connect power from source 144 to striker motor 104 when the sliding door 16 is almost closed and mechanically latched on striker member 102, but not yet pulled in, to actuate striker motor 104 to pull striker member 102 and sliding door 16 inwardly and forwardly to its fully closed position. A buzzer 160 is electrically connected to ribbon switch 148 so that it will sound an alarm whenever an object is caught between sliding door 16 and front wall 150 of opening 14. A timer 164 electrically interconnects closed door contact 152 and a relay switch 166 for providing a predetermined time delay once operating switch 164 is activated, in order to allow door solenoid 154 to unlatch forward latch member 156 and the rearward latch of sliding door 16 before striker motor 104 is actuated to move striker member 102 and sliding door 16 outwardly and rearwardly, so sliding door 16 can be pulled to its fully open position. A second relay switch 168 electrically interconnects striker motor 104 and striker stop switch 158. Third and fourth relay switches 170 and 172 electrically interconnect drive motor 39 and power source 144. A fifth relay switch 174 electrically interconnects ribbon switch 148 and buzzer 160. All relay switches are spring biased and shown in their normal position.

In operation, operating switch 146 is moved to the open position "O" by an operator. Since sliding door 16 is in its closed position, power from power source 144 feeds across door closed contact 152 to door solenoid 154 to unlatch forward latch 156 and rear latch to unlatch sliding door 16. After a predetermined time delay provided by timer 164, power is received by first relay switch 166 and fourth relay switch 172 and both are moved to closed position "C" to energize striker motor 104 and drive motor 39 simultaneously. Striker motor 104 rotates striker member 102 and moves the rearward portion of sliding door 16 outwardly and slightly rearwardly relative to side wall 19. Drive motor 39 and coil 68 of electromagnetic clutch 40, which are wired to be powered simultaneously, are energized to move cable 30 longitudinally toward the rearward end of vehicle 10 to move sliding door 16 to its fully opened position, as illustrated in FIG. 1. When operating switch 146 is released, drive motor 39 and electromagnetic clutch 40 are de-energized. If operating switch 146 is released prior to full opening of sliding door 16 then movement of sliding door 16 will stop. If operating switch 146 is released after sliding door 16 is fully open then the clutch will simply slip.

To close sliding door 16, operating switch 146 is moved in the opposite direction to the closed position "C". Third relay switch 170 will move to closed position "C" to energize drive motor 39 and electromagnetic clutch 40 in the opposite direction, which will move cable 30 longitudinally toward the forward end of vehicle 10 to close sliding door 16 and cause the rear latch (not shown) to mechanically engage striker member 102. As sliding door 16 approaches its closed position, striker stop switch 158 is actuated by the door to its closed position to move second relay switch 168 to closed position "C" to energize striker motor 104. Striker motor 104 pivots striker member 102 in an opposite direction and cooperates with the rearward end of sliding door 16 to pull or move it slightly forwardly and inwardly toward side wall 19. When this occurs, forward door latch 156 mechanically latches and door closed contact 152 is contacted so that it can again feed power to door solenoid 154 when desired. Because of the clutch, which permits overriding motor 39, the door can be manually opened and closed at any time.

As previously stated, if an object or person gets sandwiched between sliding door 16 and front wall 150, ribbon switch 148 will be closed. When this occurs, power from power source 144 will energize fifth relay switch 174 to disconnect drive motor 39 and actuate buzzer 160 which will be sounded. When the object or person is removed, operating switch 146 can be reactuated to continue closing of sliding door 16.

Referring to FIGS. 9 and 10, a second embodiment of powered sliding door system 28 is shown. Like parts have like numerals. Second embodiment of powered sliding door system 28 includes a guide tube, generally indicated at 180, to guide cable 30 through electromagnetic clutch 40. Guide tube 180 is attached by suitable means such as welding to an outer housing 181 of electromagnetic clutch 40. Guide tube 180 includes a first portion 182 and a second portion 184 extending longitudinally through outer housing 181 of electromagnetic clutch 40. First and second portions 182 and 184 have a contoured end 186 and 188, respectively, mating with the contour or arcuate shape of outer housing 181 for electromagnetic clutch 40. Second portion 184 also includes an enlarged end 190 at its free end. Cable 30 extends through enlarged end 190 and a passageway defined by guide tube 180 and drivingly engages gear 46 of electromagnetic clutch 40.

Second embodiment of powered sliding door system 28 eliminates ribbon switch 148 and includes a speed sensor, generally indicated at 192, for sensing the speed of cable 30 to allow control circuit 142 to determine or detect when an object is caught between sliding door 16 and front wall 150. Speed sensor 192 is a rotary generator 194 secured by suitable means such as welding to outer housing 181 of electromagnetic clutch 40. Speed sensor 192 includes a shaft 196 extending outwardly from rotary generator 194. Speed sensor 192 also includes a gear 198 attached to one end of shaft 196 and partially disposed in an aperture 199 extending through a wall of second portion 184 to drivingly engage cable 30 extending through guide tube 180. Teeth of gear 198 drivingly engage recesses between coils of third wire 38.

In operation, cable 30 extends through guide tube 180 and is moved by drive motor 39 and electromagnetic clutch 40. As cable 30 moves longitudinally, cable 30 rotates gear 198 and shaft 196 of rotary generator 194. Rotation of shaft 196 causes rotary generator 194 to provide an electrical output signal to control circuit 142 which is proportional to the speed of cable 30. When a reduction in speed occurs, speed sensor 192 produces a change in voltage of the electrical output signal. Control circuit 142 detects the change in voltage and then disconnects power to drive motor 39. Speed sensor 192 is operative during closing of sliding door 16 for the total span of the door.

Referring to FIG. 11, a flowchart of the operation for the second embodiment of powered sliding door system 28 is shown. System 28 may include an electronic control unit (ECU) in control circuit 142 and use a methodology to be described for the operation of system 28. The methodology enters through bubble 200 and advances to diamond 204. In diamond 204, the methodology determines whether the operating switch 146 is in the open position "O" when moved by an operator. If operating switch 146 is in the open position, the methodology advances to block 206 and energizes door solenoid 154 to unlatch forward latch 156 and rear latch to unlatch sliding door 16. The methodology then advances to block 208 and delays for a predetermined time period. The methodology advances to block 210 and energizes the striker motor 104 and drive motor 39 simultaneously. As a result, striker motor 104 rotates striker member 102 and moves the rearward portion of sliding door 16 outwardly. Drive motor 39 and electromagnetic clutch 40 move cable 30 and sliding door 16 rearwardly to the open position. The methodology then advances to diamond 214 and determines whether operating switch 146 has been released. If not, the methodology advances to block 212, previously described, and moves cable 30 and sliding door 16 rearward. If operating switch 146 has been released, the methodology advances to block 216 and de-energizes drive motor 39 and electromagnetic clutch 40 and stops rearward movement of cable 30 and sliding door 16. The methodology then exits through bubble 218.

In diamond 204, if operating switch 146 is not in the open position but is moved to the closed position "C", the methodology advances to block 220 and energizes drive motor 39 and electromagnetic clutch 40 in the opposite direction. The methodology advances to block 222 and moves cable 30 and sliding door 16 forward to the closed position. The methodology advances to block 224 and senses the speed of cable 30 and sliding door 16 by speed sensor 192. The methodology advances to diamond 226 and determines whether the speed of sliding door 16 is less than a predetermined speed stored in memory. If so, the methodology advances to block 228 and de-energizes drive motor 39 and electromagnetic clutch 40 and stops forward movement of sliding door 16. The methodology then exits through bubble 218.

If the speed of sliding door 16 is not less than the predetermined speed, the methodology advances to diamond 229 and determines whether operating switch 146 has been released. If so, the methodology advances to block 228, previously described, to de-energize drive motor 39 and electromagnetic clutch 40. If operating switch 146 has not been released, the methodology advances to diamond 230 and determines whether sliding door 16 has actuated striker stop switch 158. If not, the methodology advances to block 222 and continues to move cable 30 and sliding door 16 forward. If so, the methodology advances to block 232 and energizes striker motor 104 to pivot striker member 102. The methodology advances to block 234 and moves rearward portion of sliding door 16 inwardly toward side wall 19. The methodology then advances to block 236 and latches forward door latch 156 and closes door closed contact 152. The methodology then advances to block 238 and feeds power to door solenoid 154. The methodology then exits through bubble 218.

The present invention has been described in an illustrative manner. It is to be understood that the terminology used is intended to be in the nature of words of description rather than of limitation. Modifications or variations of the present invention are possible in light of the above teachings. Therefore, within the scope of the appended claims, the present invention may be practiced otherwise than as specifically described.

What is claimed is:

1. A powered sliding door system for a vehicle, comprising:
   a cable mounted for generally longitudinal movement and having a first longitudinally forwardly disposed free end and a second longitudinally rearwardly disposed free end, and means adjacent said first end for securing said cable to the vehicle door;
   driving means drivingly engaging said cable intermediate said first and second ends;
   motor means for powering said driving means; and
   clutch means for operatively interconnecting said motor means and said driving means, whereby actuation of said motor means and engagement of said clutch means will cause said driving means to move said cable longitudinally for opening and closing the sliding door.

2. A system as set forth in claim 1 wherein said cable is semi-rigid.

3. A system as set forth in claim 2 wherein said motor means and said clutch means are always simultaneously energized.

4. A system as set forth in claim 1 wherein said clutch means is an electromagnetic clutch which is engaged when electrically actuated.

5. A system as set forth in claim 4 wherein said electromagnetic clutch means comprises a rotatable drive member operatively connected to said motor means, a coil disposed adjacent said drive member for producing a magnetic field and an armature engageable with said drive member in response to the magnetic field and connected to said driving means to move said cable.

6. A system as set forth in claim 5 wherein said drive member comprises a shaft having a first end operatively engageable with said motor means and a second end, and a clutch member secured to said second end.

7. A system as set forth in claim 6 wherein said armature comprises an annular armature member disposed about said shaft and mounted between said clutch member and said coil for limited axial movement, said driving means including a gear driven by said armature member, said gear being disposed on the other side of said coil from said armature member.

8. System as set forth in claim 7 wherein said electromagnetic clutch means includes a bracket member surrounding said gear and shaft and adapted to mount said electromagnetic clutch means to the vehicle.

9. A system as set forth in claim 8 wherein said bracket member includes a centrally disposed aperture, said gear being disposed in said aperture, and a passageway extending through said bracket and communicating with said aperture, said cable extending through said passageway.

10. A system as set forth in claim 1 wherein said cable comprises a helically wound wire with spaced coils.

11. A system as set forth in claim 10 wherein said helically wound wire has a core of longitudinally extending wires.

12. A system as set forth in claim 11 wherein said core of wires is twisted.

13. A system as set forth in claim 10 wherein said helically wound wire has a core including a helically wound second wire of opposite hand than said first wire.

14. A system as set forth in claim 10 wherein said helically wound wire has a core of longitudinally extending wires, and a helically wound second wire of opposite hand than said first wire wound around said core of longitudinally extending wires.

15. A system as set forth in claim 10 including lubricant-holding bristles extending outwardly between adjacent coils of said wire.

16. A system as set forth in claim 1 wherein said cable is slidably disposed in a tube affixed to said vehicle.

17. A system as set forth in claim 1 including striker means located near a rearward end of the sliding door for moving the rearward end thereof inwardly and outwardly relative to the body of the vehicle.

18. A system as set forth in claim 17 wherein said striker means comprises a striker member mounted operatively to the body of said vehicle and means for pivotally moving said striker member.

19. A system as set forth in claim 18 including a striker pivot link having one end pivotally connected to the vehicle body and means for securing said striker member to said striker pivot link.

20. A system as set forth in claim 19 wherein said moving means comprises a projection operatively engaging said striker pivot link and a striker motor for operatively cooperating with said projection to rotate said projection.

21. A system as set forth in claim 1 including a control circuit for controlling the opening and closing of the sliding door.

22. A system as set forth in claim 21 wherein said control circuit includes a pressure sensitive switch to disconnect electrical power to said driving means when an object is caught between the sliding door and body of the vehicle.

23. A system as set forth in claim 22 wherein said control circuit includes an alarm electrically connected to said pressure sensitive strip to produce sound whenever said pressure sensitive switch is tripped.

24. A system as set forth in claim 23 wherein said control circuit includes a manually actuatable operating switch and a timer electrically interconnecting said operating switch and said driving means to provide a predetermined time delay once said operating switch is activated before operating said motor means.

25. A powered sliding door system for a vehicle, comprising:
a cable mounted for generally longitudinal movement and having a first longitudinally forwardly disposed free end and a second longitudinally rearwardly disposed free end, and means adjacent said first end for securing said cable to the vehicle door;
driving means drivingly engaging said cable intermediate said first and second ends;
motor means for powering said driving means, whereby actuation of said motor means will cause said driving means to move said cable longitudinally for opening and closing the sliding door; and
sensing means operatively engaging said cable for sensing the speed of said cable when moved.

26. A system as set forth in claim 25 wherein said sensing means comprises a rotary generator for producing an output signal proportional to the speed of said cable.

27. A system as set forth in claim 26 wherein said rotary generator includes a shaft having a gear at one end for engaging said cable.

28. A system as set forth in claim 27 including a guide tube attached to said driving means, said cable extending through said guide tube.

29. A system as set forth in claim 28 wherein said guide tube includes means defining an aperture extending through a wall thereof, said gear having a portion extending through said aperture and engaging said cable.

30. A powered sliding door system for a vehicle, comprising:
a cable mounted for generally longitudinal movement and having a first longitudinally forwardly disposed free end and a second longitudinally rearwardly disposed free end, and means adjacent said first end for securing said cable to the vehicle door;
driving means drivingly engaging said cable intermediate said first and second ends;
motor means for powering said driving means, whereby actuation of said motor means will cause said driving means to move said cable longitudinally for opening and closing the sliding door; and
a rotary generator including a shaft having a gear at one end for engaging said cable to produce an output signal proportional to the speed of said cable when moved.

* * * * *

UNITED STATES PATENT AND TRADEMARK OFFICE
CERTIFICATE OF CORRECTION

PATENT NO. : 5,076,016
DATED : December 31, 1991
INVENTOR(S) : Allan J. Adams and Michael P. Alexander It is certified that error appears in the above-identified patent and that said Letters Patent is hereby corrected as shown below:

Column 1, line 7, "1990" should be -- 1989 --.

Column 9, line 19, "System" should be -- A system --.

Signed and Sealed this

Eighteenth Day of May, 1993

Attest:

MICHAEL K. KIRK

*Attesting Officer*     *Acting Commissioner of Patents and Trademarks*